G. H. BLETTNER.
PISTON RING MILLING MACHINE.
APPLICATION FILED NOV. 3, 1915.

1,223,929.

Patented Apr. 24, 1917.
6 SHEETS—SHEET 1.

Witnesses:
H. S. Bull.
B. G. Richards.

Inventor,
George H. Blettner,
by Johnson Hopps
his Attorney.

G. H. BLETTNER.
PISTON RING MILLING MACHINE.
APPLICATION FILED NOV. 3, 1915.

1,223,929.

Patented Apr. 24, 1917.
6 SHEETS—SHEET 2.

Witnesses:
H. J. Bull.
B. G. Richards

Inventor,
George H. Blettner,
by Joshua R H Potts
his Attorney.

G. H. BLETTNER.
PISTON RING MILLING MACHINE.
APPLICATION FILED NOV. 3, 1915.
1,223,929.
Patented Apr. 24, 1917.
6 SHEETS—SHEET 3.
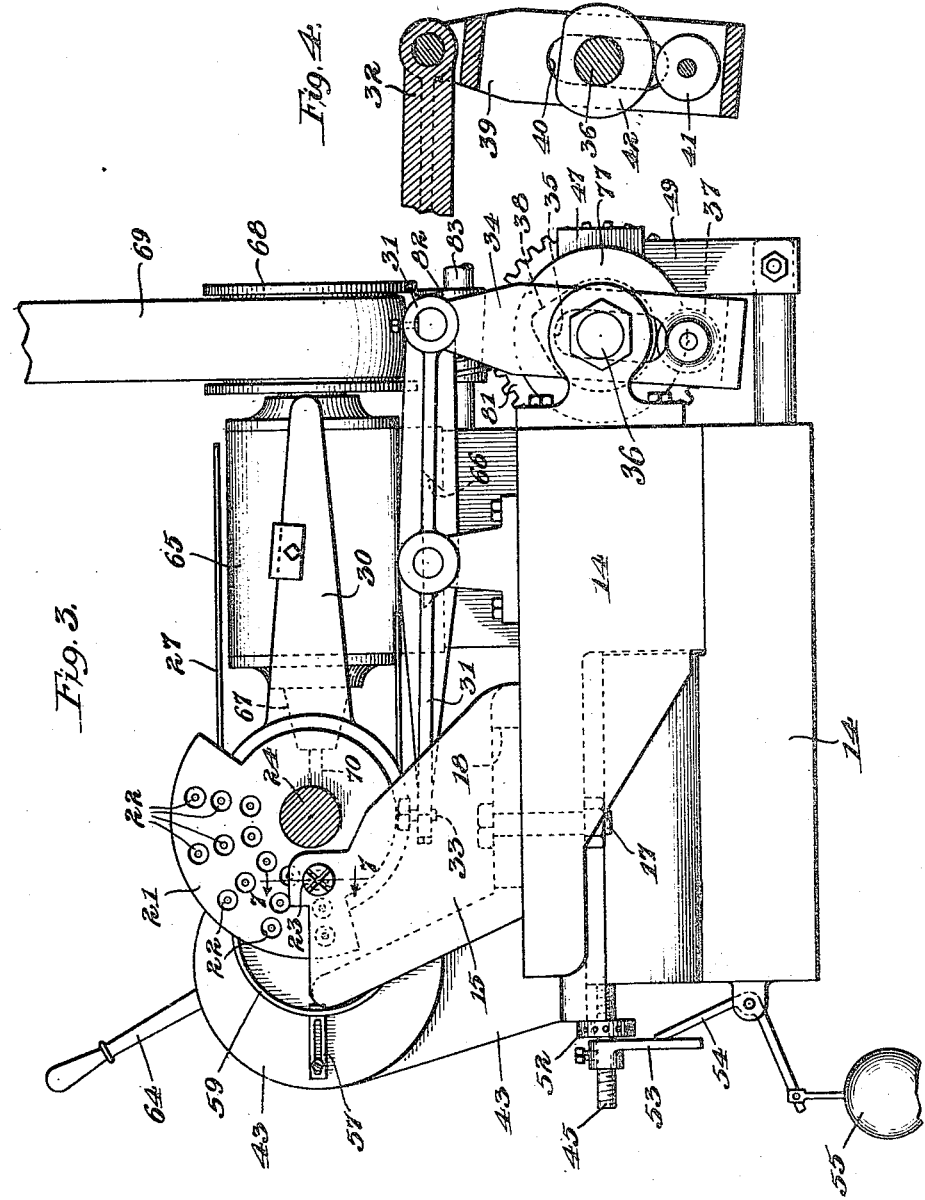
Witnesses:
H. S. Bull
B. G. Richards
Inventor,
George H. Blettner,
by Joshua R. H. Potts
his Attorney.

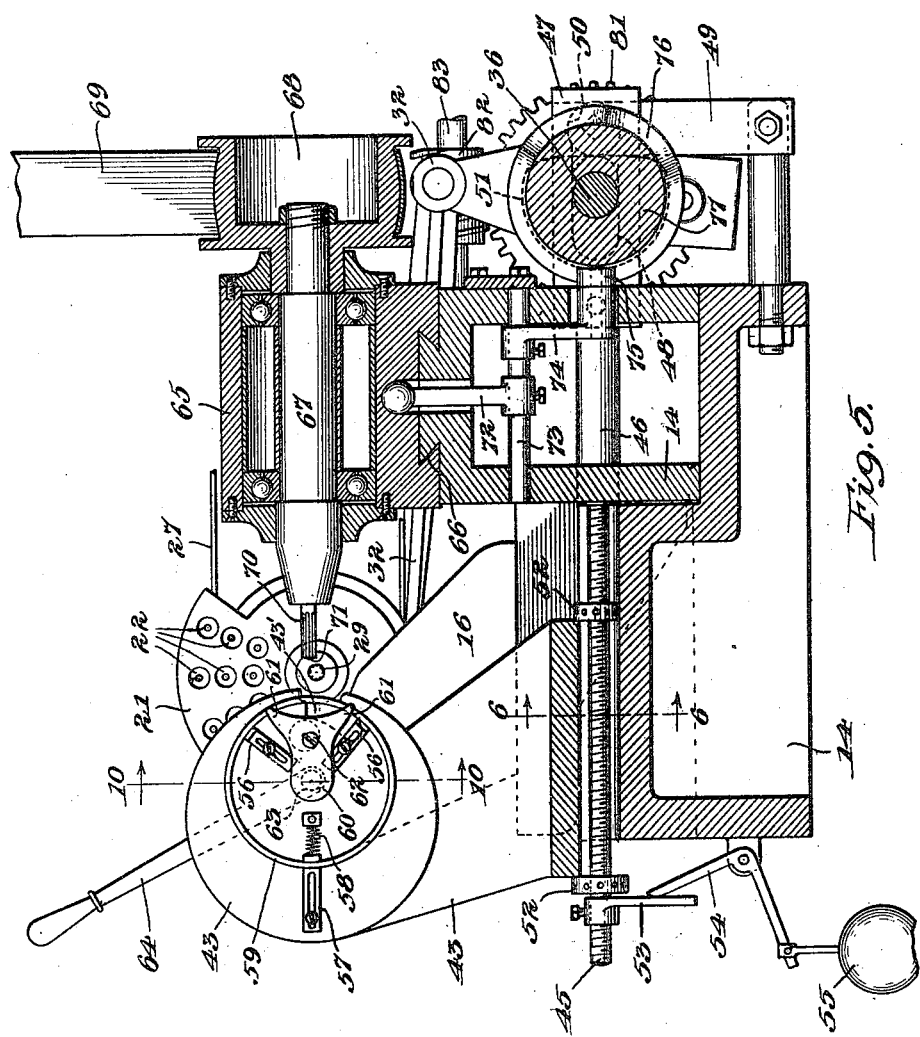

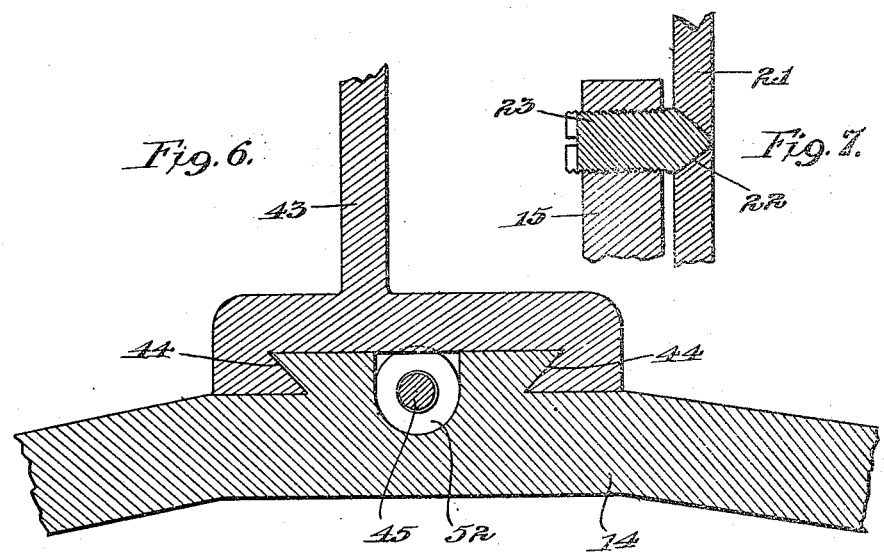
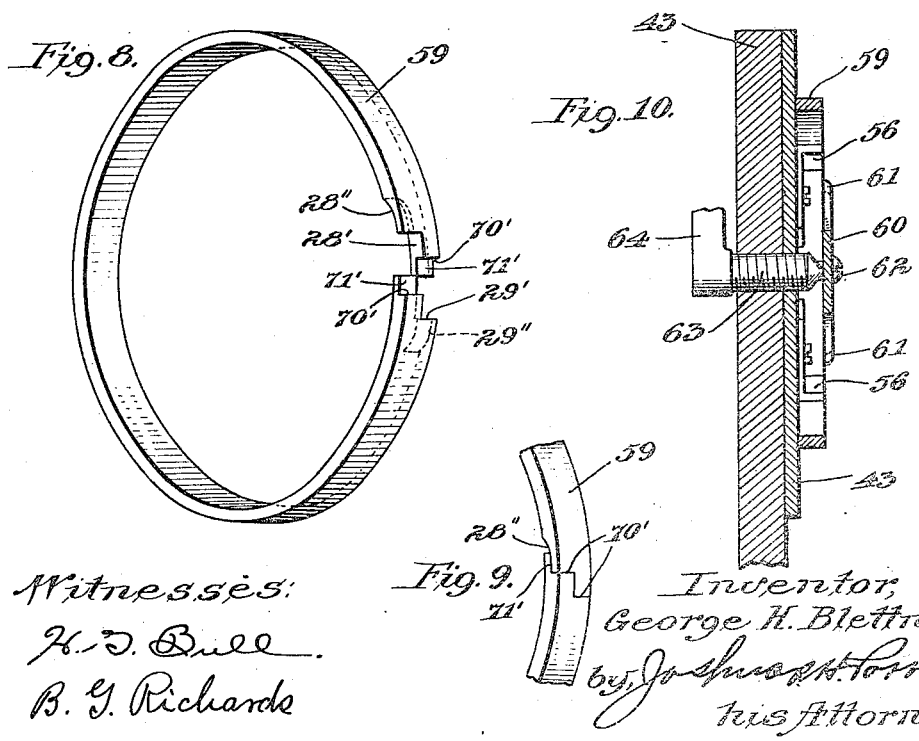

G. H. BLETTNER.
PISTON RING MILLING MACHINE.
APPLICATION FILED NOV. 3, 1915.
1,223,929.
Patented Apr. 24, 1917.
6 SHEETS—SHEET 6.
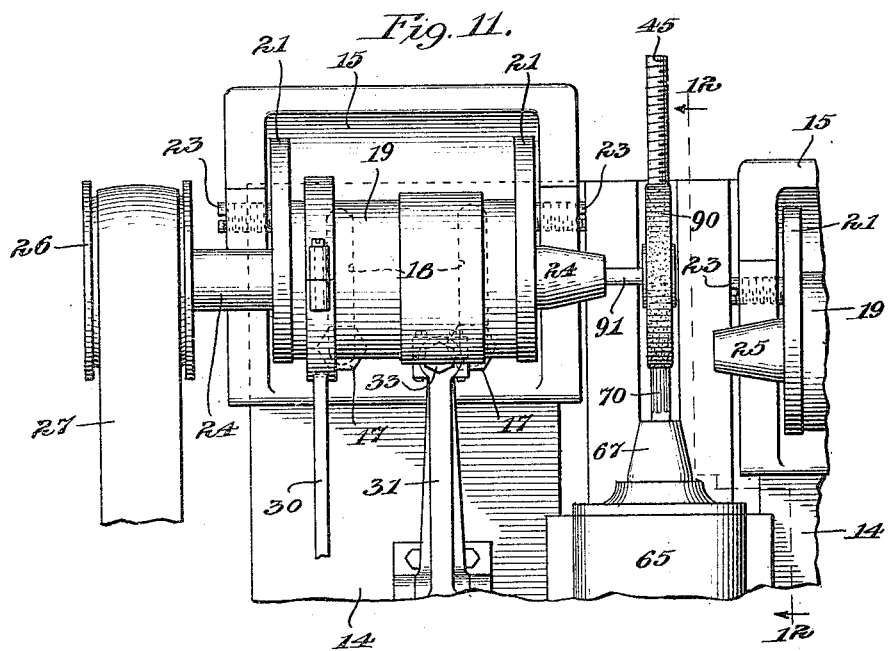
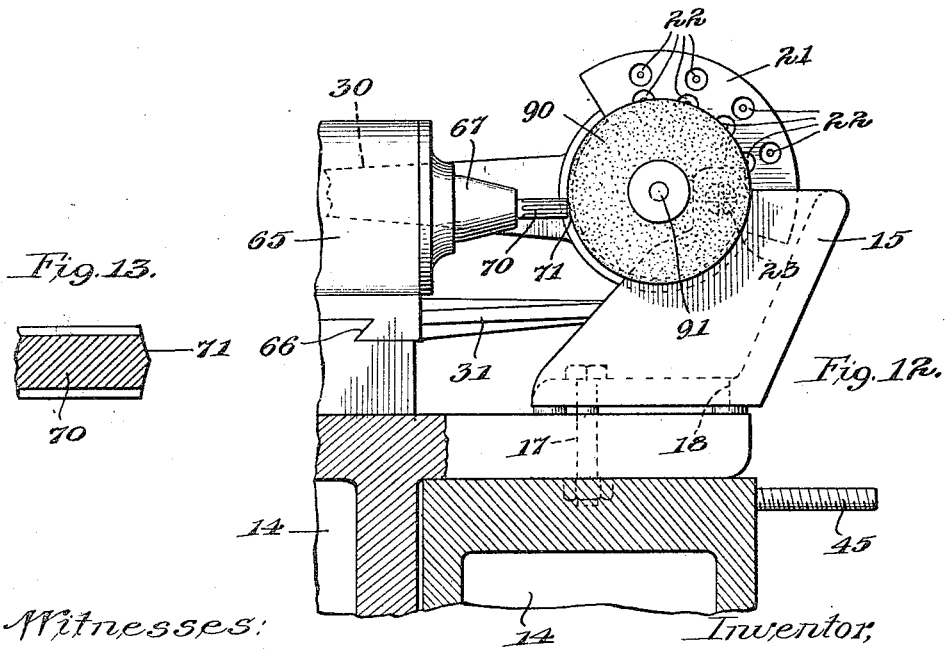
Witnesses:
H. S. Bull
B. G. Richards
Inventor:
George H. Blettner,
by Joshua R. H. Potts
his Attorney.

UNITED STATES PATENT OFFICE.

GEORGE H. BLETTNER, OF CHICAGO, ILLINOIS.

PISTON-RING-MILLING MACHINE.

1,223,929.  Specification of Letters Patent.  Patented Apr. 24, 1917.

Application filed November 3, 1915. Serial No. 59,390.

*To all whom it may concern:*

Be it known that I, GEORGE H. BLETTNER, a citizen of the United States, and a resident of the city of Chicago, county of Cook, and State of Illinois, have invented a certain new and useful Piston-Ring-Milling Machine, of which the following is a specification.

My invention relates to piston ring milling machines, and more especially to machines for forming the gap in an ordinary split piston ring, the object of the invention being to provide a simple and efficient machine of this character capable of forming the gaps in piston rings with great rapidity and accuracy.

The invention consists in the combinations and arrangements of parts hereinafter described and claimed.

Figure 1:
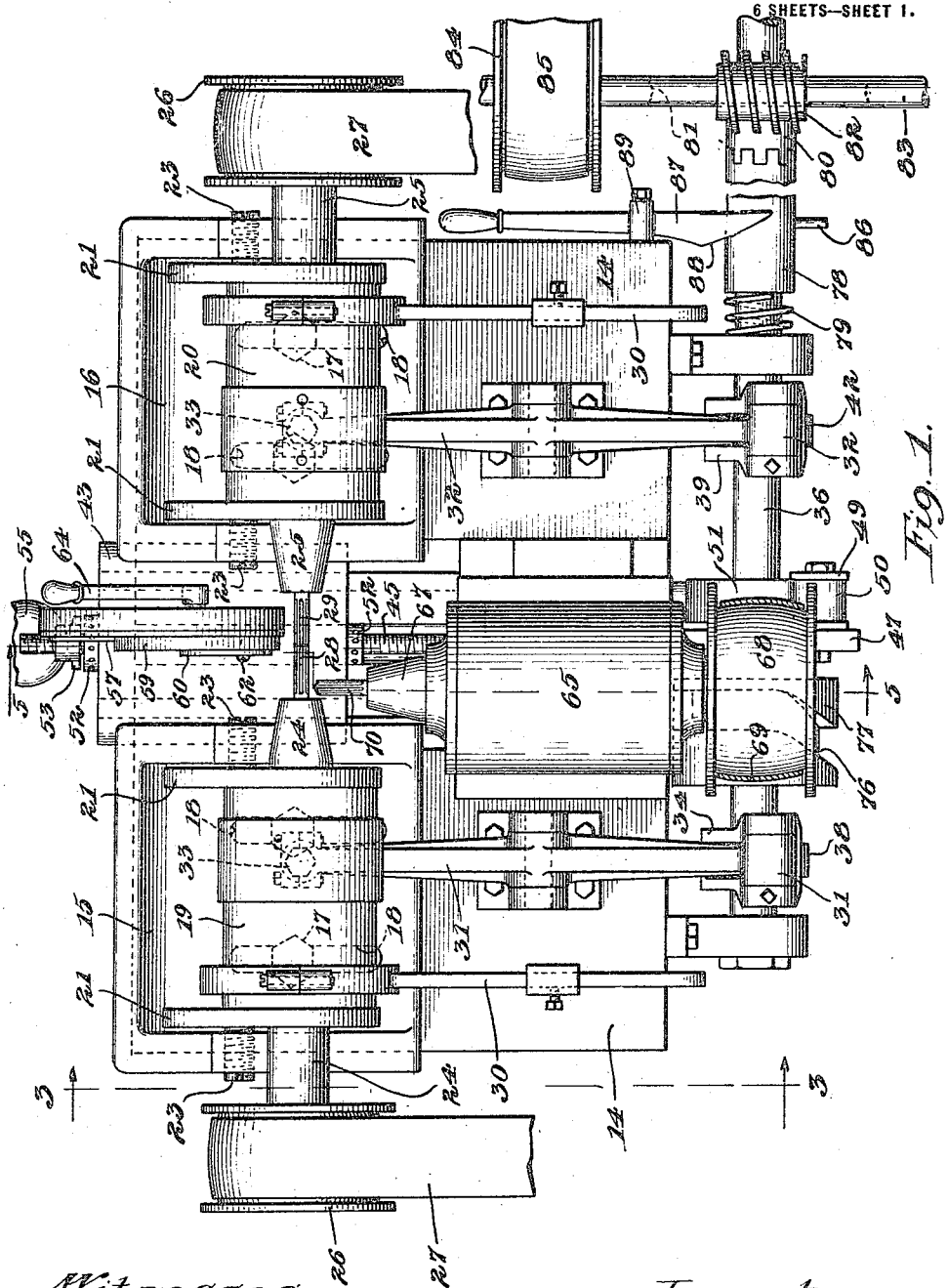
Figure 2:
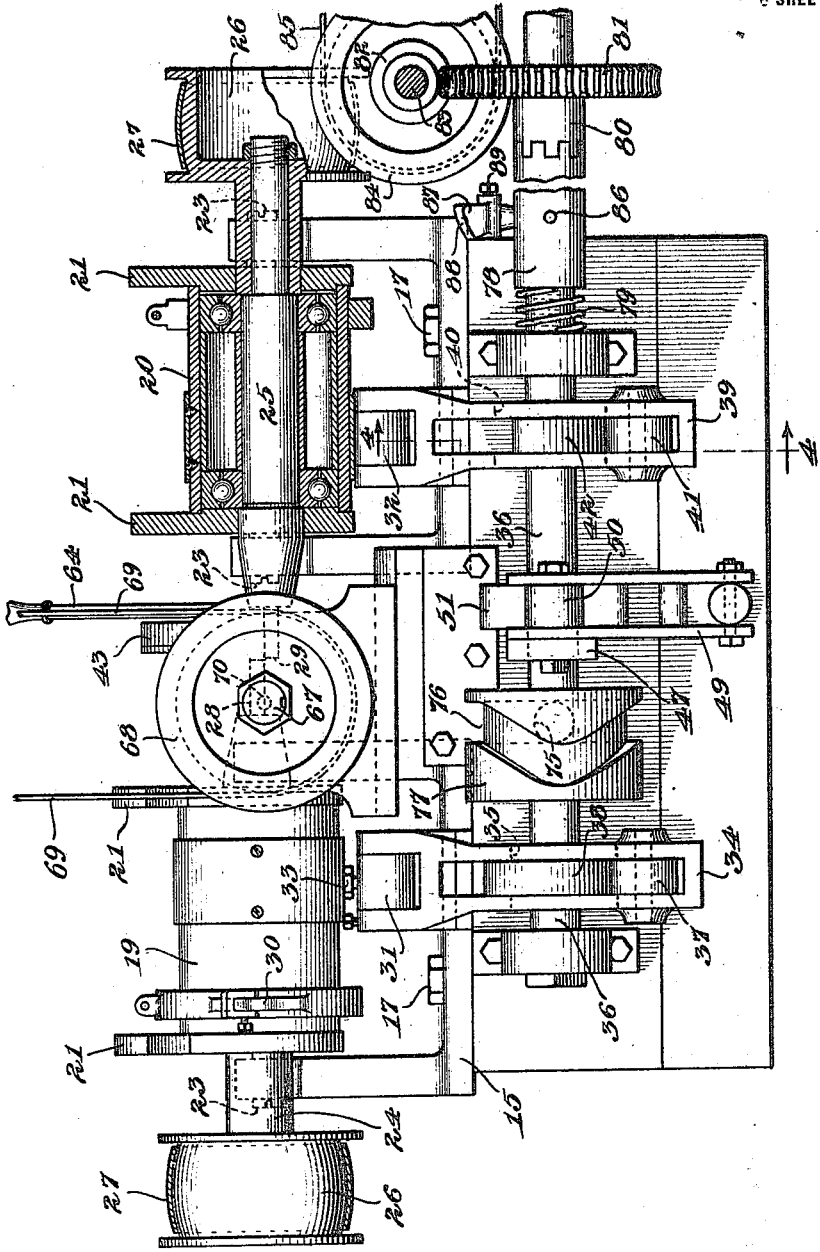

The invention will be best understood by reference to the accompanying drawings forming a part of this specification, and in which, Figure 1 is a top plan view of a machine embodying my invention, Fig. 2, a rear elevation of the same, Fig. 3, a section taken on line 3—3 of Fig. 1, Fig. 4, a section taken on line 4—4 of Fig. 2, Fig. 5, a section taken substantially on line 5—5 of Fig. 1, Fig. 6, an enlarged section taken on line 6—6 of Fig. 5, Fig. 7, an enlarged section taken on line 7—7 of Fig. 3, Fig. 8, an enlarged perspective view of a finished piston ring cut on the machine, Fig. 9, a partly perspective view of said piston ring shown in position of use, Fig. 10, an enlarged section taken on line 10—10 of Fig. 5, Fig. 11, a top plan view showing an emery wheel mounted for forming the end of one of the milling cutters employed in the machine, Fig. 12, a section taken on line 12—12 of Fig. 11, and Fig. 13, an enlarged detail section taken through the end of a milling cutter shaped by the emery wheel mounted as shown in Figs. 11 and 12.

The preferred form of construction, as illustrated in the drawings, comprises a suitable supporting frame 14 having saddles or brackets 15 and 16 adjustably mounted thereon by means of bolts 17 taking through slots 18 in said saddles. Bearing blocks 19 and 20 are mounted respectively in saddles 15 and 16, said bearing blocks being provided at opposite ends with mounting flanges 21 provided with conical bearing seats 22 therein adapted to receive the conical points of bearing screws 23 mounted in the respective saddles, as indicated, said bearing screws being mounted in transversely alining pairs so as to form oscillating axes for the bearing blocks 19 and 20, as will be readily understood, and the different sets of seats 22 being provided to permit of adjustments of the centers of oscillation of said bearing blocks for different sizes of piston rings. Spindles 24 and 25 are rotatably mounted in bearing blocks 19 and 20 respectively, each of said spindles being constantly driven by a suitable driving pulley 26 and driving belt 27, as indicated. The spindles 24 and 25 are mounted with their axes in the same vertical plane, with the axis of spindle 24 located slightly above the axis of spindle 25, as best shown in Figs. 1 and 2, and milling tools 28 and 29 are mounted in said spindles 24 and 25 respectively, so that the ends of said tools fall substantially in the same vertical plane and the lower side of tool 28 alines substantially with the upper side of tool 29. The tools 28 and 29 are provided with cutting teeth on their sides and ends, as indicated. Each of the bearing blocks 19 and 20 is provided with a laterally extending weighted lever 30 normally holding the corresponding bearing block in contact with the inner end of a corresponding operating lever 31 or 32, as the case may be, each of said operating levers being provided with a bearing set screw 33 at its inner end contacting with the inner side of the corresponding bearing block 19 or 20.

As best shown in Fig. 3, the lever 31 is pivotally connected at its end opposite the set screw 33 with the upper end of a yoke 34 provided in its sides with slots 35 working over the master shaft 36 of the machine. Yoke 34 carries a roller 37 running on the periphery of a cam 38 on shaft 36, the arrangement being such that as shaft 36 rotates the outer end of lever 31 will be depressed, thus elevating bearing block 19 and consequently spindle 24 and milling cutter 28.

As best shown in Figs. 1 and 4, the outer end of lever 32 is pivotally connected with a yoke 39 and provided at its sides with slots 40 operating over shaft 36 and carrying a roller 41 running on the periphery of a cam 42 on shaft 36. By this arrangement, rotation of shaft 36 permits elevation of the outer end of lever 32 under the influence of the weight of bearing 20 and lever 30 so as to depress spindle 25 and milling cutter 29, as will be readily understood. As best shown in Figs. 1, 5 and 6, a work-carrying traveling carriage 43 is given a dovetail connection 44 with the top of frame 14 so as to permit of the approach or recession of said carriage to and from operative relation with the cutters 28 and 29. The movements of carriage 43 are effected through the medium of a threaded rod 45 having rigidly secured thereto an enlargement 46 slidably mounted in suitable bearings in the frame 14 and connected at its rear end with a bar 47 provided with a slot 48 operating on shaft 36. Bar 47 is pivotally connected with the upper end of a rocker arm 49 carrying a roller 50 running on the periphery of a cam 51 on shaft 36. The rod 45 is adjustably connected with the carriage 43 by means of collars or nuts 52 mounted on rod 45 and bearing on opposite sides of said carriage, as shown in Fig. 5. Rod 45 also carries a depending adjustable finger 53 contacting with one arm of a bell crank 54, the other arm of which is provided with a weight 55. By this arrangement, it will be observed that upon rotation of shaft 36, the carriage 43 will be moved to the right under the influence of the cam 51 and held in advanced position for a considerable period, and then moved to the left under the influence of weight 55, thus effecting an operative reciprocation thereof. By means of the collars 52, the position to which the carriage is moved may be nicely adjusted as desired.

Adjustable chuck members 56 are secured to the side of carriage 43 at its upper end and coöperate with a chuck member 57 yieldingly operated by means of a spring 58, said chuck members being arranged and adapted to position and support an ordinary piston ring 59 on the side of carriage 43, as best shown in Fig. 5. A clamping member 60 provided with divergent arms 61 is loosely mounted on a set screw 62 on the side of carriage 43 within ring 59, and another screw 63 threaded in said carriage is given a bearing against said clamping member and provided with an operating handle 64. It will be observed that the arms 61 are arranged to engage ring 59 on opposite sides of a gap 43″ formed in carriage 43 and may be tightened into clamping position by means of handle 64 operating screw 63, the details of this arrangement being illustrated in Fig. 10. By adjusting chuck members 56, different sizes of rings may be readily mounted in the chuck thus provided. The arrangement is such, and the parts are so timed and proportioned, that when carriage 43 moves to the right from the position indicated in Fig. 5, the milling cutters 28 and 29 will be passed part way through opposite halves of ring 59 forming slots 28′ and 29′ therein, as indicated in Fig. 8. Then cutter 28 is caused to oscillate upwardly and cutter 29 is caused to oscillate downwardly, thus cutting notches 28″ and 29″ in the piston ring, as best indicated in Fig. 8, the gap 43′ in the carriage 43 permitting such movements and operations of the cutters 28 and 29. The parts are also so arranged that when cutters 28 and 29 are respectively oscillated upwardly and downwardly, the center of oscillation coincides substantially with the center of the piston ring 59 so that the slots cut thereby will correspond in curvature to the curvature of said piston ring, bearing seats 22 permitting of different adjustments for different sizes of piston rings.

Another bearing block 65 is given a dovetail connection 66 with frame 14 and carries another spindle 67 constantly driven by means of a pulley 68 and a belt 69 and another milling cutter 70 provided with a blunt point 71 is arranged in spindle 67 at substantially right angles to the cutters 28 and 29 to coöperate therewith to cut a transverse notch 70′ across the piston ring, as best illustrated in Fig. 8. As best illustrated in Fig. 5, the bearing block 65 is operated by means of a rocker arm 72 carried by a rocker shaft 73 provided with an operating arm 74 carrying a roller 75 running in a cam slot 76 in a cam 77 on shaft 36. The cam slot 76 is so shaped as shown, to cause the bearing block 65 to move on frame 14 to pass the milling cutter 70 through the outer portion of ring 59 and adjoining portions of slots 28′ to form projections adapted to fit within the notches 28″ and 29″, as best indicated in Figs. 8 and 9, the end 71 of the tool 70 being shaped, as will be explained hereinafter, to form surfaces 71′ curved to nicely fit the outer surfaces of notches 28″ and 29″.

As best shown in Figs. 1 and 2, the operation of the machine is controlled through the medium of a clutch sleeve 78 splined or feathered on shaft 36 and normally held by means of a spring 79 in engagement with the clutch member 80 carried by a worm wheel 81 fixed on shaft 36. Worm wheel 81 meshes with a worm 82 on a drive shaft 83 constantly driven through the medium of a pulley 84 and a belt 85. Clutch sleeve 78 carries a pin 86 coöperating with a controlling lever 87 having a beveled nose 88 and pivoted at 89 on the frame 14. The arrangement is such that when lever 87 is set in the path of pin 86, the clutch sleeve 78 will be automatically thrown out of engagement with clutch member 80 and held in such position by said lever. Removal of said lever permits return of the clutch member 78 and further operation of the machine. In normal operation, the lever 87 is manipulated to start the machine after a piston ring has been secured in its chuck and then reset to automatically stop the machine at the end of a complete revolution of master shaft 36, the cutting or forming of the gap in the piston ring being completed and parts returned to normal positions after one complete revolution of shaft 36, as will be readily understood.

It will be observed that in order to obtain a nice fit between surfaces 71′ and the outer surfaces of the notches 28″, the same must be cut to the same curvature or to the curvature of the piston ring itself. To this end I provide an emery or other abrasive wheel 90 which carries an operating stem 91 capable of being mounted in spindle 24. To properly shape the tool 70, the saddle 15 and the bearing blocks 65 are adjusted as shown in Fig. 11 to bring the upper side of tool 70 substantially coplanar with the axis of wheel 90, as best indicated in Fig. 12. Then by oscillating the wheel 90 during operation thereof and rotating the cutter 70, the end of the cutter 70 will be ground into a blunt point 71 the sides of which correspond in curvature to the curvature of the piston ring and will thus cut the surfaces 71′ to nicely fit the outer surfaces of the notches 28″ and 29″, thus effecting a gas-tight joint at this place.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising a frame; a rotatable cutter on said frame; a chuck on said frame; means for moving said chuck to pass said cutter partially through said work; and means for oscillating said cutter after said movement about an axis distanced from its axis of rotation, substantially as described.

2. A machine of the class described comprising a frame; a rotatable cutter on said frame; a work carrying chuck on said frame; means for applying work in said chuck to said cutter; means for oscillating said cutter during its operation about an axis distanced from its axis of rotation to cut a surface curved with the axis of oscillation as a center; and means for adjusting the axis of oscillation, substantially as described.

3. A machine of the class described comprising a frame; a rotatable cutter on said frame; a chuck on said frame; means for moving said chuck to pass said cutter partially through said work; means for oscillating said cutter after said movement about an axis distanced from its axis of rotation; and means for adjusting the axis of oscillation, substantially as described.

4. A machine of the class described comprising a frame; a piston ring chuck on said frame; a rotatable cutter on said frame mounted to oscillate about an axis located at substantially the center of a piston ring in said chuck; means for subjecting a piston ring in said chuck to the cutting operation of said cutter; and means for oscillating said cutter during its cutting operation to cut a notch in said ring substantially to the curvature thereof, substantially as described.

5. A machine of the class described comprising a frame; a piston ring chuck on said frame; a rotatable cutter on said frame mounted to oscillate about an axis located at substantially the center of a piston ring in said chuck; means for subjecting a piston ring in said chuck to the cutting operation of said cutter to pass said cutter partially therethrough; and means for oscillating said cutter during its cutting operation to cut a notch in said ring substantially to the curvature thereof, substantially as described.

6. A piston ring milling machine comprising a frame; a rotatable cutter on said frame; a piston ring chuck on said frame; means for applying work in said chuck to said cutter; means for oscillating said cutter during its cutting operation about an axis located in the neighborhood of the center of a piston ring in said chuck to cut a notch in said ring substantially to the curvature thereof; and means for adjusting the axis of oscillation, substantially as described.

7. A piston ring milling machine comprising a frame; a rotatable cutter on said frame; a piston ring chuck on said frame; means for applying work in said chuck to said cutter to pass said cutter partially through a piston ring in said chuck; means for oscillating said cutter during its cutting operation about an axis located in the neighborhood of the center of a piston ring in said chuck to cut a notch in said ring substantially to the curvature thereof; and means for adjusting the axis of oscillation, substantially as described.

8. A machine of the class described comprising a frame; two parallel rotatable milling cutters oppositely arranged on said frame with their ends adjoining and in substantially the same plane, said cutters being arranged with their axes out of alinement with each other; a chuck on said frame; means for applying work in said chuck to said cutters; and means for oscillating said cutters in opposite directions during their operation, substantially as described.

9. A machine of the class described comprising a frame; two parallel rotatable milling cutters oppositely arranged on said frame with their ends adjoining and in substantially the same plane, said cutters being arranged with their axes out of alinement with each other, substantially as described; a piston ring chuck movably mounted on said frame in operative relation with said cutters; and means for moving said chuck to present a piston ring carried thereby to said cutters to cut a gap therein, substantially as described.

10. A machine of the class described comprising a frame; two parallel rotatable milling cutters oppositely arranged on said frame with their ends adjoining in substantially the same plane; a piston ring chuck movably mounted on said frame in operative relation with said cutters; means for moving said chuck to present a piston ring carried thereby to said cutters to cut a gap therein; means for oscillating said cutters in opposite directions to cut notches in the inner sides of said ring on opposite sides of the gap therein; a third milling cutter arranged at right angles to said first mentioned cutters; and means for moving said third cutter across the outer portion of said ring at the gap to form projections to fit said notches, substantially as described.

11. A machine of the class described comprising a frame; two parallel rotatable milling cutters oppositely arranged on said frame with their ends adjoining and in substantially the same plane; a piston ring chuck movably mounted on said frame in operative relation with said cutters; automatic means for moving said chuck to present a piston ring carried thereby to said cutters to cut a gap therein; means for oscillating said cutters in opposite directions to cut notches in the inner sides of said ring on opposite sides of the gap therein; a third milling cutter arranged at right angles to said first mentioned cutters; and means for moving said third cutter across the outer portion of said ring at the gap to form projections to fit said notches, substantially as described.

12. A machine of the class described comprising a frame; two parallel rotatable milling cutters oppositely arranged on said frame with their ends adjoining and in substantially the same plane; a piston ring chuck movably mounted on said frame in operative relation with said cutters; means for moving said chuck to present a piston ring carried thereby to said cutters to cut a gap therein; automatic means for oscillating said cutters in opposite directions to cut notches in the inner sides of said ring on opposite sides of the gap therein; a third milling cutter arranged at right angles to said first mentioned cutters; and automatic means for moving said third cutter across the outer portion of said ring at the gap to form projections to fit said notches, substantially as described.

13. A machine of the class described comprising a frame; two parallel rotatable milling cutters oppositely arranged on said frame with their ends adjoining and in substantially the same plane; a piston ring chuck movably mounted on said frame in operative relation with said cutters; automatic means for moving said chuck to present a piston ring carried thereby to said cutters to cut a gap therein; automatic means for oscillating said cutters in opposite directions to cut notches in the inner sides of said ring on opposite sides of the gap therein; a third milling cutter arranged at right angles to said first mentioned cutters; and automatic means for moving said third cutter across the outer portion of said ring at the gap to form projections to fit said notches, substantially as described.

In testimony whereof I have signed my name to this specification in the presence of two subscribing witnesses.

GEORGE H. BLETTNER.

Witnesses:
JOSHUA R. H. POTTS,
HELEN F. LILLIS.